US009195425B2

(12) United States Patent
Juchem (10) Patent No.: US 9,195,425 B2
(45) Date of Patent: Nov. 24, 2015

(54) PRINTING WITH PAYMENT VALIDATION (75) Inventor: Murilo Juchem, Porto Alegre (BR)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 14/397,601

(22) PCT Filed: Jul. 30, 2012

(86) PCT No.: PCT/US2012/048876
§ 371 (c)(1),
(2), (4) Date: Oct. 28, 2014

(87) PCT Pub. No.: WO2014/021825
PCT Pub. Date: Feb. 6, 2014

(65) Prior Publication Data
US 2015/0124278 A1    May 7, 2015

(51) Int. Cl.
*G06F 3/12* (2006.01)
*G06Q 20/40* (2012.01)
*G07F 17/26* (2006.01)
*G06Q 20/34* (2012.01)

(52) U.S. Cl.
CPC ............ *G06F 3/1272* (2013.01); *G06F 3/1203* (2013.01); *G06F 3/1239* (2013.01); *G06F 3/1287* (2013.01); *G06Q 20/34* (2013.01); *G06Q 20/40* (2013.01); *G07F 17/26* (2013.01)

(58) Field of Classification Search
None
See application file for complete search history.

(56) References Cited

U.S. PATENT DOCUMENTS

| | | | | |
|---|---|---|---|---|
| 6,957,393 B2* | 10/2005 | Fano | ...................... | G06Q 10/10 701/408 |
| 7,075,672 B2* | 7/2006 | Onishi | ............... | G06Q 20/0453 340/5.2 |
| 7,526,222 B2 | 4/2009 | Fukuda | | |
| 7,562,222 B2* | 7/2009 | Gasparini | ........... | H04L 63/0823 713/155 |
| 7,756,749 B2* | 7/2010 | Simpson | ................ | G06Q 30/06 705/26.35 |
| 8,068,247 B2* | 11/2011 | Wu | ........................ | G06F 3/1204 358/1.12 |
| 8,189,220 B2 | 5/2012 | Subramanian | | |
| 8,810,825 B2* | 8/2014 | Watanabe | ............... | G06F 3/122 358/1.14 |
| 2002/0114004 A1* | 8/2002 | Ferlitsch | ............... | G06F 3/1203 358/1.15 |
| 2004/0059674 A1* | 3/2004 | Hatano | ................... | G06Q 20/02 705/40 |
| 2004/0064387 A1* | 4/2004 | Clarke | ................... | G06Q 30/04 705/34 |

(Continued)

OTHER PUBLICATIONS

International Search Report & Written Opinion received in PCT Application No. PCT/US2012/048876, Mar. 28, 2013, 10 pages.

(Continued)

*Primary Examiner* — Ted Barnes
(74) *Attorney, Agent, or Firm* — Trop, Pruner & Hu, P.C.

(57) ABSTRACT

In one embodiment, a request to print content at a network connected printer is received from a requestor computer system via a network. Upon receipt of the request, a release code is created to authorize printing of the content when provided at the printer, and job information for the request and data associating the information with the code are stored in memory. The code, and a network address to connect the requestor system to a web site hosted by a payment validation computer system, are sent to the requestor system via the network. The code is received from the validation system, the code previously provided to the validation system by the requestor system. The job information is sent to the validation system. A payment validation is received from the validation system. The content is sent to the printer, for printing upon provision of the code at the printer.

20 Claims, 5 Drawing Sheets

(56) References Cited

U.S. PATENT DOCUMENTS

| | | | | |
|---|---|---|---|---|
| 2005/0024682 | A1* | 2/2005 | Hull | G06F 17/30017 358/1.18 |
| 2005/0179937 | A1* | 8/2005 | Horihata | H04N 1/00244 358/1.15 |
| 2005/0203805 | A1* | 9/2005 | Clough | G06Q 30/04 705/26.1 |
| 2008/0275748 | A1* | 11/2008 | John | G06Q 30/06 705/35 |
| 2009/0248632 | A1* | 10/2009 | Subramanian | G06Q 30/06 |
| 2009/0288012 | A1* | 11/2009 | Hertel | G06Q 20/02 715/738 |
| 2010/0299764 | A1* | 11/2010 | Byrne | G06F 17/30861 726/30 |
| 2011/0013219 | A1* | 1/2011 | Nuggehalli | G06F 3/1203 358/1.15 |
| 2011/0137797 | A1* | 6/2011 | Stals | G06Q 20/02 705/44 |
| 2011/0145049 | A1* | 6/2011 | Hertel | G06Q 20/02 705/14.23 |
| 2011/0188063 | A1* | 8/2011 | Nuggehalli | G06F 3/1236 358/1.13 |
| 2011/0208864 | A1* | 8/2011 | St. Laurent | H04L 67/16 709/226 |
| 2011/0209211 | A1* | 8/2011 | Kuindersma | H04L 67/16 726/12 |
| 2012/0069385 | A1* | 3/2012 | Von Hatten | G06F 3/1203 358/1.15 |
| 2012/0069386 | A1* | 3/2012 | St. Laurent | G06F 3/1204 358/1.15 |
| 2012/0233073 | A1* | 9/2012 | Salmon | G06Q 40/00 705/44 |
| 2012/0262753 | A1* | 10/2012 | Viccari | H04N 1/00307 358/1.15 |
| 2013/0021638 | A1* | 1/2013 | Hong | G06F 3/1204 358/1.14 |
| 2013/0038898 | A1* | 2/2013 | Nuggehalli | G06F 3/1222 358/1.15 |
| 2013/0107312 | A1* | 5/2013 | Venkatesh | G06F 3/1207 358/1.15 |
| 2013/0155441 | A1* | 6/2013 | Hong et al. | G06F 3/1222 358/1.14 |
| 2013/0222827 | A1* | 8/2013 | Watanabe | G06F 3/122 358/1.13 |
| 2013/0222837 | A1* | 8/2013 | Watanabe | G06F 3/1222 358/1.14 |
| 2013/0226695 | A1* | 8/2013 | Tamari | G06Q 30/02 705/14.49 |
| 2013/0229680 | A1* | 9/2013 | Kitada et al. | G06F 3/1207 358/1.15 |

OTHER PUBLICATIONS

Meyer, D. et al., "Ezeep Offers New Portal to Printing in the Cloud," (Web Page), Mar. 2, 2012, 4 pages, available at: https://gigaom.com/2012/03/02/ezeep-offers-new-portal-to-printing-in-the-cloud/.

* cited by examiner

PRINTING WITH PAYMENT VALIDATION

CROSS-REFERENCE TO RELATED APPLICATION

This application is a national stage application under 35 U.S.C. §371 of PCT/US2012/048876, filed Jul. 30, 2012.

BACKGROUND

Certain network-connected printers are capable of sending and receiving communications and printable content via the internet without being connected to a desktop computer, notebook computer, or other host computing device. Such functionality can provide considerable flexibility and efficiencies for a user, as the user may have the ability to send content to, or download and content at, such printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Certain printing services provide users with an ability to send content to a network connected printer to be printed for a fee. In an example of existing cloud-based public printing services, a service hosts an application that is accessible at a particular network connected printer and at a smartphone or other mobile computing device. A user accessing the application at the smartphone uploads to the printing service, via the application, a document or other content that the user desires to be printed. The user makes payment for the printing in advance at the smartphone via a payment process facilitated by the application. After the printing service confirms that payment for printing has been made, the service sends the content, in the form of a print job, via the internet to the printer to print A limitation of the existing printing service described above is that the payment and confirmation of payment steps are performed via a same web application that is also the vehicle for the aspects of the transaction that are related to printing (e.g. sending the print job to the printing service, sending a print job to the printer, sending or validating any release codes, etc.). Entities that contract with a print service provider for the provider to provide to the entities' customers will likely have dramatically different payment options and desire user interfaces that coincide with the entities' trade dress, legal requirements, or other design specifications. For example, a national hotel chain that provides the service will have specifications for the application that are quite different from the requirements of a bank or other highly regulated entity that provides the service. In addition, both the hotel chain and the bank's requirements will likely be much different from the requirements of an airport providing a print fulfillment service for its customers. Consequently, as the payment and confirmation of payment steps are performed via a same web application that is the vehicle for the printing steps, changing the trade dress, look and feel, and/or legal terms relating to payment in each instance within the printing application can be a time-consuming and expensive undertaking. This situation can cause the entity that provides the paid printing service, and/or the end users, to be dissatisfied with the printing service that includes the network connected printer, and with network connected printers generally.

Accordingly, various embodiments described herein were developed to enable a cloud-based printing service that efficiently interacts with a payment validation process occurring at a payment validation website distinct from the print fulfillment system. In an example of the disclosure, a print fulfillment system hosting the print fulfillment service receives from a requestor computer system via a network, a request to print content at a network connected printer. Upon receipt of the request, the fulfillment system creates a release code to authorize printing of the content when the release code is provided at the printer, and stores in memory job information for the print request and data associating the job information with the release code. The print fulfillment system sends to the requestor system, via the network, the release code and a network address to connect the requestor system to a web site hosted by a payment validation computer system. The requestor computer sends the release code to a payment validation computer system, via a payment validation web site hosted by the validation system. The payment validation computer system in turn submits the release code to the print fulfillment system. Responsive to receipt of the release code, the print fulfillment system sends the print job information to the payment validation system. Utilizing the print job information, the payment validation computer system calculates a job cost and implements a payment process with a user. After confirming that payment has been made that is appropriate for the print job, in light of the print job information, the payment validation computer system sends data indicative of payment to the print fulfillment system. Responsive to receipt of the payment validation, the print fulfillment system sends the content to the printer for printing. Printing occurs at the printer upon the provision of the release code at the printer.

Advantages of the disclosure include that the print fulfillment system can efficiently operate with a variety of payment validation web sites that utilize different payment algorithms and customized interfaces, without the need to write or amend code to support each customer's payment method or other payment requirements. As the payment process is separate from the print fulfillment process, it is not necessary to change or amend the print fulfillment service (the customer facing application for printing) for each entity utilizing the service. Another advantage of the disclosure is that a user is not required to implement a payment method at the printer. In an example, a printer with a small touch panel or other user interface may be utilized for fulfillment as a user may enter a release code at the printer as opposed to a lengthy credit card or other payment process. The advantages described in this paragraph make it possible for the print fulfillment system to support a large number of entities and customers with disparate requirements relating to payments for printing, and to utilize printers with minimal user interface components.

As used in this application, "content" refers to text, images, and/or other subject matter or other information that can be received by a computer system for printing, and/or stored at the computer system, e.g., for later printing. A "job" or "print job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data. A "printer" or "printing device" refers to any thermal ink transfer printer, piezo ink transfer printer, dry toner-based printer, liquid toner-based printer, or any other electronic device that prints. "Printer" or "printing device" includes any multifunctional electronic device that performs a function such as scanning and/or copying in addition to printing. A "network-connected printer" refers to a printer that is connected to a network, to be capable of obtaining content, sending and receiving messages, accessing network content, and/or accessing applications via a network. An "address" for a web site or web page refers to an identifier for the web page or web site relative to other web pages or web sites on a network (e.g., the internet), and may include, but is not limited to, a URL or other network address. A "printer application" refers to a software application that is accessible to a user at a network-connected printer and that enables retrieval of content, via the network, from computing devices external to the printer. A "web browser" refers to any combination of hardware and programming configured to retrieve, present, and traverse information over an internet or intranet. An "in-application browser" refers to a web browser application that is launched during user interaction with another software application. "Mobile computing device" and "mobile device" are used synonymously, and refer to any portable computing device capable of communicating with another computing device. A "link" or "hyperlink" refers to a character string, address, button, or other interactive element included within an electronic document, web page, or other application page with a first network address that, when interacted with by a user, e.g., via a user interface device, causes the loading of an electronic document, web page, or application page with a second network address.

Figure 1:
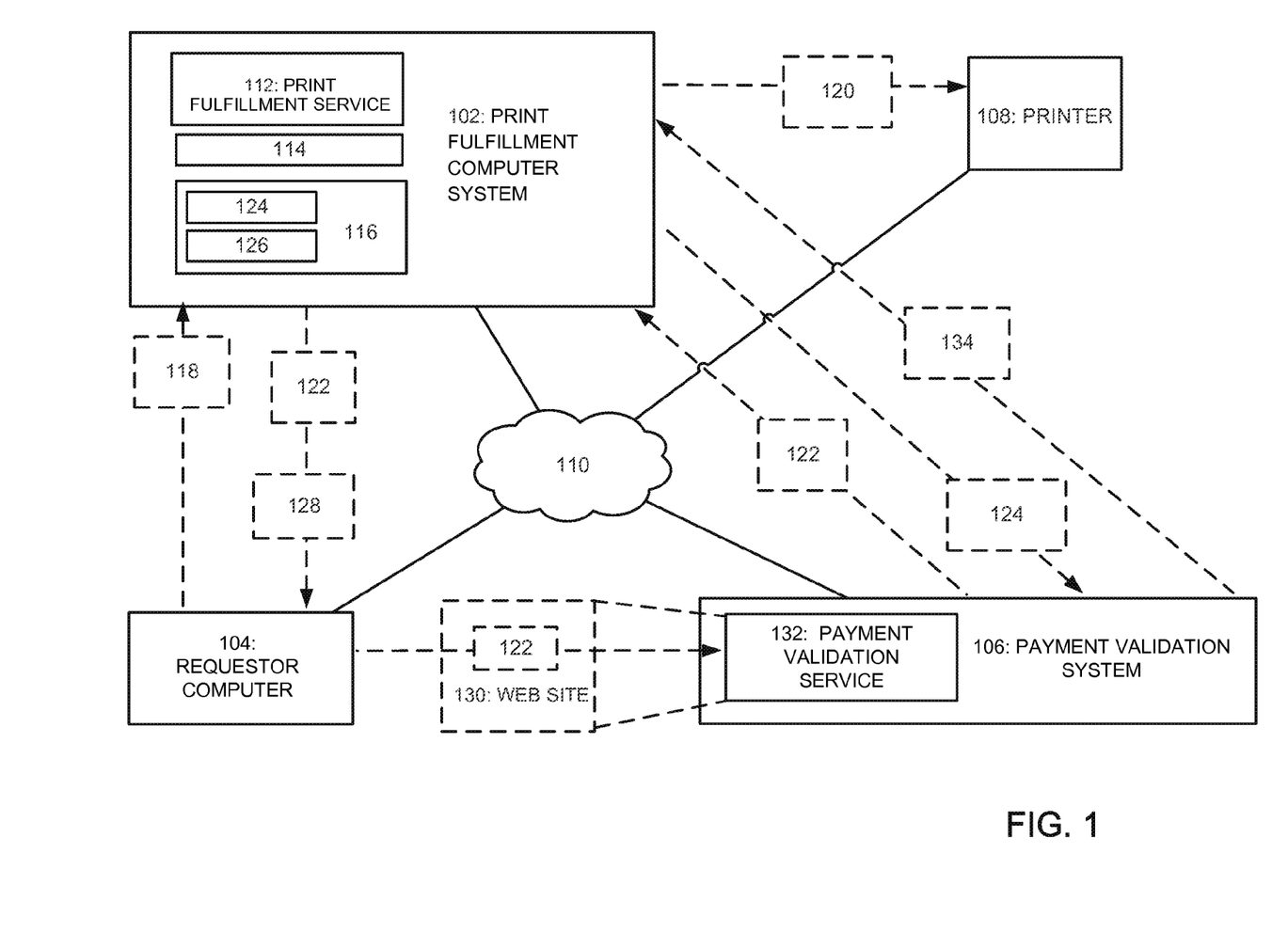
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 1 shows a print fulfillment computer system 102 electronically connected to a requestor computer 104, a payment validation computer system 106, and a printer 108 via a network 110. Print fulfillment computer system 102 represents generally any computing device or group of computing devices configured to send and receive network requests, send and receive data, and/or otherwise communicate with, requestor computer 104, payment validation computer system 106, and printer 108. In examples, print fulfillment computer system 102 may be or include a server, desktop computer, notebook computer, mobile device, tablet computer, and/or any other computing device.

Requestor computer 104 represents generally a computing device, or group of computing devices, configured to send and receive network requests, send content to, and otherwise communicate with, print fulfillment computer system 102 and payment validation computer system 106. In examples, requestor computer 104 may be a smartphone, tablet computer, notebook computer, desktop computer, or any other computing device.

Payment validation computer system 106 represents generally any computing device or group of computing devices configured to send and receive network requests, send and receive data, and/or otherwise communicate with, print fulfillment computer system 102 and requestor computer 104. In examples, requestor computer system 104 may be or include a server, desktop computer, notebook computer, mobile device, tablet computer, and/or any other computing device.

Printer 108 represents generally a network connected printer that is operable to produce a printed print job or printed content. Network connected printer 108 is additionally operable to send network requests, print jobs and other content to, receive network requests, print jobs, and other content from, and otherwise communicate with print fulfillment computer system 102 over network 110.

Network 110 represents generally hardware components and computers interconnected by communications channels that allow sharing of resources and information. Network 110 may include a cable, wireless, fiber optic, or remote connection via a telecommunication link, an infrared link, a radio frequency link, or some combination of these, or any other connectors or systems that provide electronic communication. Network 110 may include, at least in part, an intranet, the internet, or a combination of both. Network 110 may also include intermediate proxies, routers, switches, load balancers, and the like. The paths followed by network 110 between the print fulfillment computer system 102, requestor computer 104, payment validation computer system 106, and printer 108 as depicted in FIG. 1 represent the logical communication paths between these devices, not necessarily the physical paths between the devices.

Print fulfillment computer system 102 is shown to include a print fulfillment service 112, a processor 114, and a memory 116. Print fulfillment service 112 represents generally any combination of hardware and programming configured to provide a cloud-based printing service that efficiently interacts with a payment validation service hosted at a payment validation computer system distinct from the print fulfillment system. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, the print fulfillment service 112 executing at the print fulfillment computer system 102 receives from the requestor computer system 104, via the network 110, a request 118 to print content 120 at network connected printer 108. In an example, the request 118 is a request initiated by a user via the user's interaction with the requestor computer 104. In an example, the content 120 is content that is included within the print request 118. In another example, the print request 118 does not include the content 120, but rather includes a network address provides a link to the content 120 (e.g., the print request may include a URL or address for a web page that includes the content 120 to be printed).

Upon receipt of the print request 118, the print fulfillment service 112 creates a release code 122. The release code 122 may be a letter, figure, character, or any other symbol, or any combination of such symbols, that when presented by a user at the printer 108 will authorize printing of the content 120 at the printer 108. In examples, the release code 122 may be a string of alphabetic characters, a string of numeric characters, or a string of alphanumeric characters. In addition, after receipt of the print request 118, the print fulfillment service 112 causes job information 124 relating to the print request 118, and data 126 associating the job information 124 with the release code 122, to be stored in a memory, e.g., memory 116. In examples, the job information 124 may be data or information regarding parameters of the print job, such as number of pages, orientation, paper size, black and white versus color printing, etc. In an example, the data 126 associating the job information 124 with the release code 122 may be stored in a database or other memory included within print fulfillment computer system 102. In another example, the data 126 associating the job information 124 with the release code 122 may be stored in a database or other memory included within a computing device or system distinct from the print fulfillment computer system 102.

The print fulfillment computer system 102 sends the created release code 122 to the requestor computer 104 via the network 110. The print fulfillment computer system 102 also sends to the requestor computer 104 a network address 128, the address to connect the requestor computer 104 to a web site 130 hosted by a payment validation service 132 executing at the payment validation computer system 106. In an example, the web site 130 is a web site to process fees or charges to be paid in connection with the print request 118. In an example, the network address 128 is a URL or hyperlink that is to be interacted with by a user at the requestor computer via a user interface to cause a web browser application at the requestor computer 104 to access the web site 130. In yet another example, the network address 128 is a URL or hyperlink or other address that is not displayed to a user, the address causing the requestor computer 104 to automatically access the web site 130.

The payment validation service 132 that hosts the payment validation web site 130 sends the release code 122 to the print fulfillment system. Responsive to receipt of the release code 122 at the print fulfillment system, the print fulfillment service 112 sends the print job information 124 to the payment validation computer system 106. In this example, the payment validation service 132 utilizes the print job information 124 to determine a price for the printing of the content 120 at the requested printer 108. In examples, the pricing may be a factor of job information 124 relating to type of content, number of pages or scroll size to be printed upon, media to be printed upon, type of marking agent to be utilized at the printer 108 (e.g. black and white versus color printing, photo ink versus general ink, etc.), or a time of day or date that printing is to occur. The foregoing list of possible job information 124 is a list of examples of print job information, and is not meant to be an exclusive listing.

In this example, the payment validation service 132 executing at the payment validation computer system 106 next provides an interface, via the web site 130, for a payment dialogue with a user the requestor computer 104. In an example, the payment validation service 132 may send to the requestor computer 104, via the user's interaction with the web site 132, a price for the requested print job and a request for payment. In examples, a user may send, via web site 130 as accessed at the requestor computer 104, an instruction to charge the print job to a credit card, a debit card, a hotel room, a previously established tab or account, or utilize another billing mechanism that is offered by the payment validation service 132 as a billing alternative. Upon completion of charge presentation and payment dialogue, the payment validation service 132 sends a payment validation notice 134 to the print fulfillment system.

Responsive to receipt of the payment validation notice 134 from the validation system, the print fulfillment service 112 sends to the printer 108, via the network 120, the content 120 that the user desires to print. The content 120 is printed at the printer 108 following a provision of the release code 122 at the printer 108. In an example, the release code 122 may be input or otherwise provided by a user at the printer 108 via a keypad, touchpad, mouse, or other user interface device. In an example, the user inputting the release code 122 at the printer 108 may be a first user that initiated the print process at the requestor computer. In another example, the user inputting the release code 122 at the printer 108 may be a second user, e.g., a second user that operates a pay for print service that the first user has sent the content 120 to for printing. In one example, the second user may have knowledge of the release code 122 by virtue of the first user communicating the code 122 to the second user. In another example, the release code 122 may be provided at the printer 108 by virtue of a user having sent the code electronically to the printer, over the network 110, from the requestor computer or another network connected computing device.

In examples, the print request 118, content 120, release code 122, print job information 124, network address 128, and payment validation notice 134, content sending request 126, and/or the printer identifier validation information 132 are transmitted over the network 114 via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

The functions and operations described with respect to the print fulfillment service 112 and the print fulfillment computer system 102 may be implemented as a non-transitory computer-readable storage medium containing instructions executed by a processor (e.g., processor 114) and stored in a memory (e.g., memory 116). In a given implementation, processor 114 may represent multiple processors, and memory 116 may represent multiple memories. Processor 114 represents generally any instruction execution system, such as a computer/processor based system or an ASIC, a computer, or other system that can fetch or obtain instructions or logic stored in memory 116 and execute the instructions or logic contained therein. Memory 116 represents generally any memory configured to store program instructions and other data.

Figure 2:
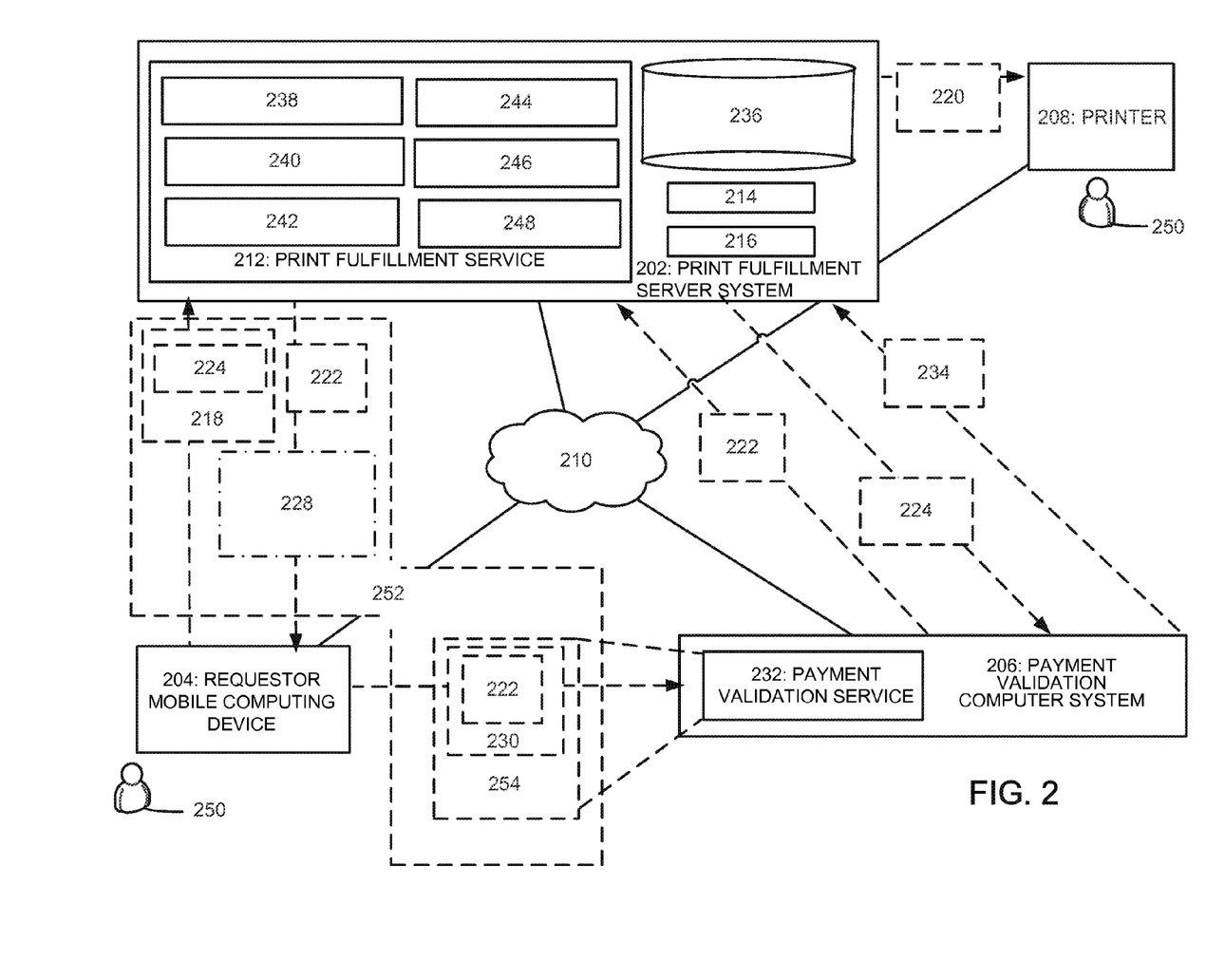
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a print fulfillment server system 202 electronically connected to a requestor mobile computing device 204, a payment validation computer system 206, and a printer 208 via an internet 210. Print fulfillment server system 202 represents generally any computing device or group of computing devices configured to send and receive network requests, send and receive data, and/or otherwise communicate with, requestor mobile computing device 204, payment validation computer system 206, and printer 208. In examples, print fulfillment server system 202 may be or include a server, desktop computer, notebook computer, mobile device, tablet computer, and/or any other computing device.

Requestor mobile computing device 204 represents generally a computing device configured to send and receive network requests, send content to, and otherwise communicate with, print fulfillment server system 202 and payment validation computer system 206. In examples, requestor mobile computing device 204 may be a smartphone, tablet computer, notebook computer, or any other computing device.

Payment validation computer system 206 represents generally any computing device or group of computing devices configured to send and receive network requests, send and receive data, and/or otherwise communicate with, print fulfillment server system 202 and requestor mobile computing device 204. In examples, requestor mobile computing device 204 may be or include a server, desktop computer, notebook computer, mobile device, tablet computer, and/or any other computing device.

Printer 208 represents generally an internet connected printer that is operable to produce a printed print job or printed content. Internet connected printer 208 is additionally operable to send network requests, print jobs and other content to, receive network requests, print jobs, and other content from, and otherwise communicate with print fulfillment server system 202 over internet 210.

Internet 210 represents generally hardware components and computers interconnected by communications channels that allow sharing of resources and information over an internet or intranet network, or over a combination of both. Internet 210 may include a cable, wireless, fiber optic, or remote connection via a telecommunication link, an infrared link, a radio frequency link, or some combination of these, or any other connectors or systems that provide electronic communication. Internet 210 may also include intermediate proxies, routers, switches, load balancers, and the like. The paths followed by internet 210 between the print fulfillment server system 202, requestor mobile computing device 204, payment validation computer system 206, and printer 208 as depicted in FIG. 2 represent the logical communication paths between these devices, not necessarily the physical paths between the devices.

Print fulfillment server system 202 is shown to include a print fulfillment service 212, a release code/job information association database 236, a processor 214, and a memory 216. Print fulfillment service 212 represents generally any combination of hardware and programming configured to provide a cloud-based printing service that can interact with a number of disparate payment validation services hosted at payment validation computer systems distinct from the print fulfillment system. The service 212 includes a print request receipt module 238, a release code and address sending module 240, a release code receipt module 242, a job information sending module 244, a payment validation receipt module 246, and a content sending module 248. Release code/job information association database 236 represents generally a database, registry, lookup table or list that associates release codes and print job information in association with one another. Processor 214 represents generally any instruction execution system, such as a computer/processor based system or an ASIC, a computer, or other system that can fetch or obtain instructions or logic stored in memory 216 and execute the instructions or logic contained therein. Memory 216 represents generally any memory configured to store program instructions and other data.

In the example of FIG. 2, a user 250 at requestor mobile computing device 204 accesses a job originating web application 252 executing at requestor mobile computing device 204. In an example, the job originating web application 252 may be a print fulfillment web page hosted by print fulfillment server system 202. In an example, the job originating web application 252 may be a print fulfillment web page hosted by print fulfillment server system 202. The user 250, via interaction with the job originating web page 252, causes sending of a print request 218 from the requestor mobile computing device 204 to the print fulfillment server system 202, via the internet 210. The print request 218 is a request to print at internet connected printer 208 specific content 220 that is referenced (e.g., via a URL or other network address within the print request 218.

Figure 3:
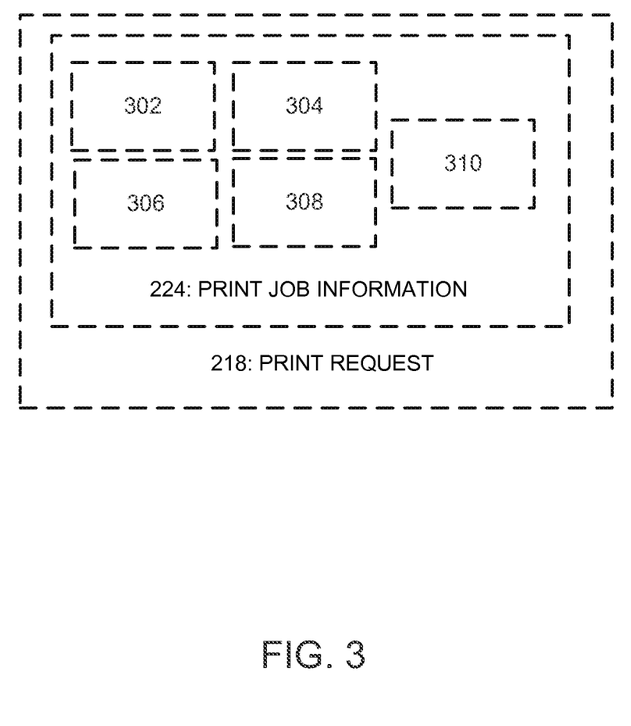
FIG. 3 is an example of a print request including print job information, according to various embodiments.

FIG. 3 provides an example of a print request 218 including print job information 224, according to various embodiments The print request 218 includes print job information 224 regarding parameters or requirements for the requested print job including but not limited to the number of pages to be printed 302, the number of copies to be printed 304, document formatting specifics 306 (e.g. image orientation on the media, black and white versus color printing, etc.), and media type 308. The print job information 224 also includes a pricing table 310 to be provided to a payment validation service 232 hosted at payment validation computer system 206. The payment validation service 232 may utilize the pricing table 310 to calculate a fee for the print job that is customized for a particular user, a particular type of print job, or a particular printer.

Returning to FIG. 2, the print request receipt module 238 included within the print fulfillment service 212 and executing at print fulfillment server system 202 receives the print request 218 from the requestor mobile computing device 204. Responsive to receipt of the print request 218, the print request receipt module 238 creates a release code 222. In examples, the release code 222 may be a string of alphabetic, numeric, or alphanumeric characters. Also responsive to receipt of the print request 218, the print request receipt module causes the print job information 224 relating to the print request 218, and data 226 associating the job information 224 with the release code 222, to be stored in memory. In this example, the print job information 224 and the data 226 are caused to be stored in the release code/job information association database 236 included within print fulfillment server system 202.

The release code and address sending module 240 sends to the requestor mobile computing device 204, via the internet 210, the created release code 222 and a URL network address 228 to connect the requestor mobile computing device 204 to a web site 230 hosted by a payment validation service 232 executing at the payment validation computer system 206. In an example, the web site 230 is a web site to process fees or charges relating to the print request 218. In this example, the sending of the URL 228 causes the requestor mobile computing device 204 to launch a web browser and access the payment validation web site 230 via the web browser. In the example of FIG. 2, the web browser that accesses the payment validation web site 230 is launched as an in-application web browser 254 with respect to the job originating web application 252 that was already being accessed by the user 250 at the requestor mobile computing device 204. The requestor mobile computing device 204 then sends the release code 222 to the payment validation service 232 at the payment validation computer system 206 via the web site 230. In this example, after the payment validation service 232 that hosts the payment validation web site 230 receives the release code 222 via the web page 220, the payment validation service 232 sends the release code 222 to the print fulfillment system 202.

Responsive to the release code receipt module 242's receipt of the release code 222 at the print fulfillment system 202, the job information sending module 244 sends the print job information 224 relative to the print request 218, stored at the release code/job information association database 236, to the payment validation computer system 206.

In this example, the payment validation service 232 executing at the payment validation computer system 206 utilizes the print job information 224 including the number of pages to be printed 302, the number of copies to be printed 304, the document formatting specifics 306, the media type 308, and the custom pricing table 310 to determine a price for the printing of the content 220 at the printer 208.

Figure 4A:
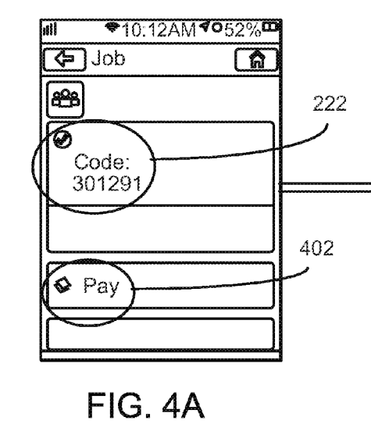
FIGS. 4A-4D are example graphic user interfaces provided by a payment validation service to implement payment dialogue, according to various embodiments.
Figures 4B, 4C:
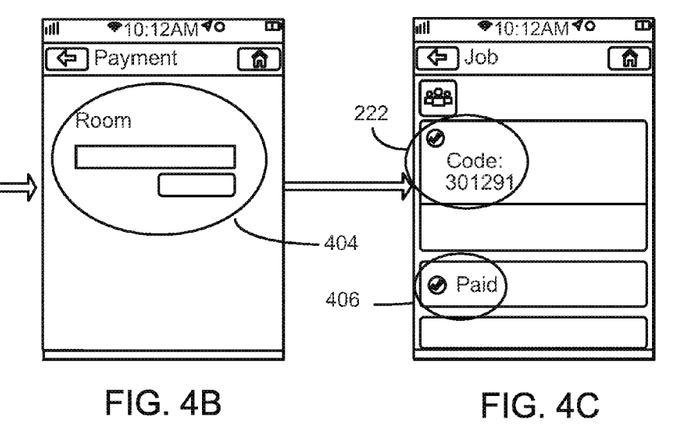
Figure 4D:
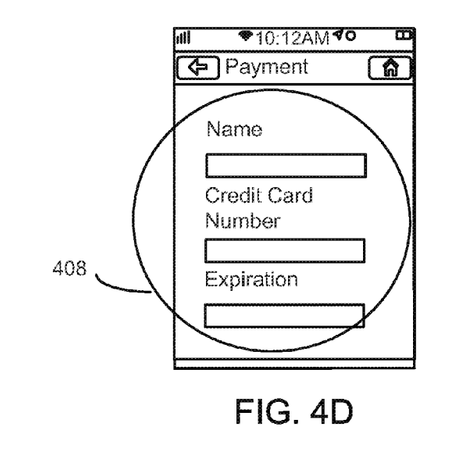

The payment validation service 232 next provides a graphic user interface, via the web site 230, to implement a payment dialogue with a user 250 at the requestor mobile computing device 204. FIGS. 4A-4D, in view of FIG. 2, depict examples of graphic user interfaces utilized to implement a payment dialogue with a user, according to various embodiments. In an example, the payment validation web site 230 (FIG. 2) hosted by the payment validation service 232 is a web site to process charges relating to the print request to a user account for a guest at a hotel. FIG. 4A illustrates the interface at a "pre-payment" stage, and includes for display to the user 250 a release code 222 set forth as "Code 301291" and a "Pay" message 402 indicating that payment is due. FIG. 4B illustrates the interface at a "payment" stage, and includes for display to the user 250 a payment text entry box 404 in which the user 250 is to enter his/her hotel room number to accomplish payment for the print job. FIG. 4C illustrates the interface at a "post-payment" stage, and includes for display to the user 250 the "Code 301291" release code 222, and a "Paid" message 406 indicating that payment for the printing of the content 220 at the printer 208 was successful or was accomplished. FIG. 4D illustrates another example of a graphic user interface at a "payment" stage, and includes for display to the user 250 a payment text entry box 404 in which the user 250 is to enter credit card information 408 to accomplish payment for the print job. Upon completion of the payment dialogue, the payment validation service 232 sends a payment validation notice 234 to the print fulfillment system 202.

Responsive to receipt of the payment validation notice 234 from the validation system, the print fulfillment service 212 sends to the printer 208, via the network 220, the content 220 that the user desires to print. The content 220 is printed at the printer 208 following a provision of the release code 222 at the printer 208 by user 250 or another user that has access to the release code 222.

The functions and operations described with respect to the print fulfillment service 212 and the print fulfillment server system 202 may be implemented as a non-transitory computer-readable storage medium containing instructions executed by a processor (e.g., processor 214) and stored in a memory (e.g., memory 216). In a given implementation, processor 214 may represent multiple processors, and memory 216 may represent multiple memories. Processor 214 represents generally any instruction execution system, such as a computer/processor based system or an ASIC, a computer, or other system that can fetch or obtain instructions or logic stored in memory 216 and execute the instructions or logic contained therein. Memory 216 represents generally any memory configured to store program instructions and other data.

Figure 5:
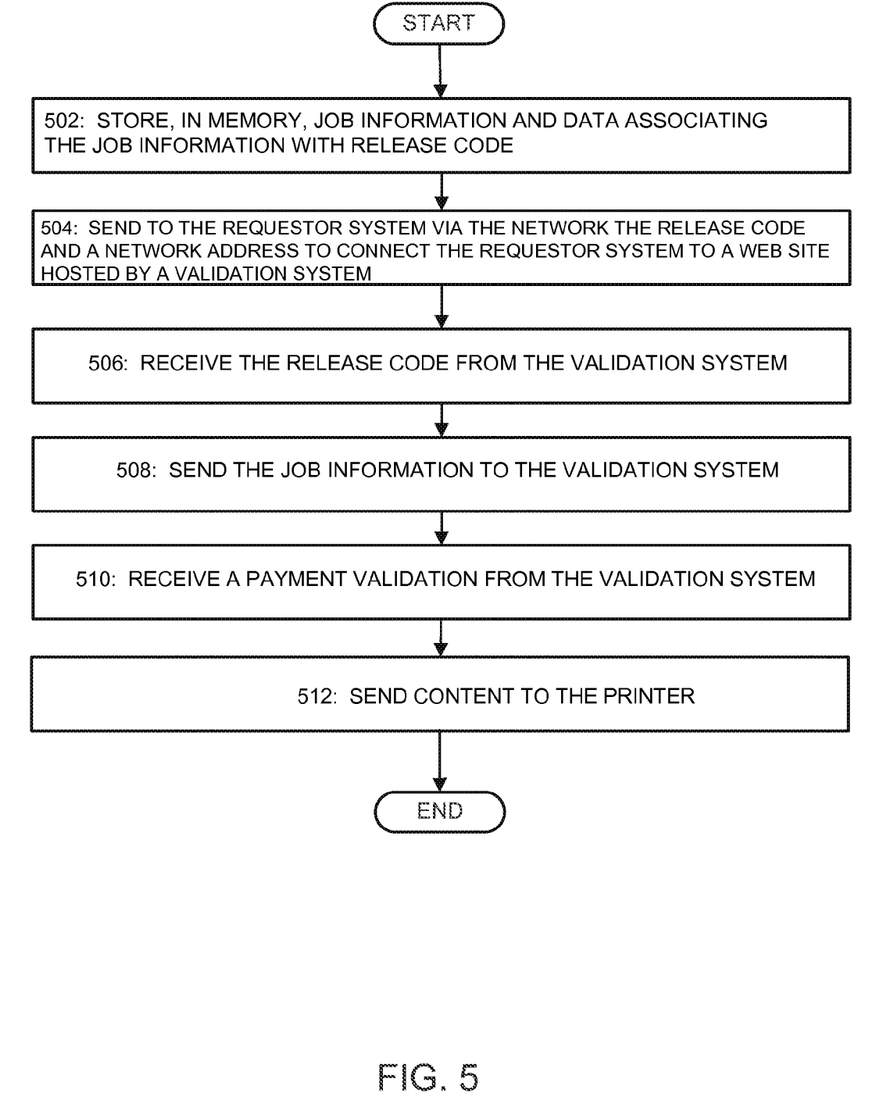
FIG. 5 a flow diagram depicting steps taken to implement various embodiments.

FIG. 5 is a flow diagram of operation in a system according to various embodiments. In discussing FIG. 5, reference may be made to the diagram of FIG. 2 to provide contextual examples. Implementation, however, is not limited to those examples. Starting with FIG. 5, upon receipt, from a requestor computer system via a network of a request to print content at a network connected printer, a release code is created. Job information is stored in memory. Data associating the job information with the release code is stored in memory (block 502). Referring back to FIG. 2, the print request receipt module 238 may be responsible for implementing block 502.

Continuing with FIG. 5, the code, and a network address to connect the requestor system to a web site hosted by a payment validation computer system, are sent to the requestor system via the network (block 504). Referring back to FIG. 2, the release code and address sending module 240 may be responsible for implementing block 504.

Continuing with FIG. 5, the code is received from the validation system. The code was previously provided to the validation system by the requestor system (block 506). Referring back to FIG. 2, the release code receipt module 242 may be responsible for implementing block 506.

Continuing with FIG. 5, the job information is sent to the validation system (block 508). Referring back to FIG. 2, the job information sending module 244 may be responsible for implementing block 508.

Continuing with FIG. 5, a payment validation is received from the validation system (block 510). Referring back to FIG. 2, the payment validation receipt module 246 may be responsible for implementing block 510.

Continuing with FIG. 5, the content is sent to the printer, for printing upon provision of the code at the printer (block 512). Referring back to FIG. 2, the content sending module 248 may be responsible for implementing block 512.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions which when executed, cause a computer to:
   in response to receipt, from a requestor computer system via a network, of a request to print content at a printer:
      create a release code to authorize printing of the content when provided at the printer,
      store, in memory, job information for the request and data associating the job information with the release code;
      send to the requestor computer system via the network the release code, and a network address to connect the requestor computer system to a web site hosted by a payment validation computer system;
      receive the release code from the payment validation computer system, the received release code previously provided to the payment validation computer system by the requestor computer system;
      in response to the received release code, send to the payment validation computer system the job information;
      receive a payment validation from the payment validation computer system; and send the content to the printer, for printing upon provision of the release code at the printer.

2. The non-transitory computer-readable storage medium of claim 1, wherein the request is received from the requestor computer system via a web application accessed at the requestor computer system.

3. The non-transitory computer-readable storage medium of claim 1, wherein the sending of the address causes launching of a web browser at the requestor computer system and accessing of the web site via the web browser.

4. The non-transitory computer-readable storage medium of claim 3, wherein the web browser is launched as an in-application browser with respect to a first web application already accessed at the requestor computer system.

5. The non-transitory computer-readable storage medium of claim 1, wherein the web site is a web site to process charges relating to the request to a user account.

6. The non-transitory computer-readable storage medium of claim 1, wherein the web site is a web site to process credit card or debit card charges relating to the request.

7. The non-transitory computer-readable storage medium of claim 1, wherein the requestor computer system is a mobile computing device.

8. The non-transitory computer-readable storage medium of claim 1, wherein the job information is included within the request.

9. The non-transitory computer-readable storage medium of claim 1, wherein the address includes a URL.

10. The non-transitory computer-readable storage medium of claim 1, wherein the payment validation is received responsive to user-entered information in a payment dialog presented by the payment validation computer system, the payment dialog presenting a price, for the request, based on the job information.

11. A print fulfillment computer system comprising:
at least one processor; and
a non-transitory computer-readable storage medium storing instructions executable by the at least one processor to:
in response to receipt, from a requestor computer system via a network, of a request to print content at a network connected printer:
create a release code to authorize printing of the content when provided at the network connected printer,
send to the requestor computer system via the network the release code, and a network address to connect the requestor computer system to a web site hosted by a payment validation computer system;
receive the release code from the payment validation computer system, the received release code previously provided to the payment validation computer system by the requestor computer system;
in response to the received release code, send to the payment validation computer system job information for the request;
receive a payment validation from the payment validation computer system; and
send the content to the network connected printer, for printing upon provision of the release code at the network connected printer.

12. The print fulfillment computer system of claim 11, wherein the request is received from the requestor computer system via a web application accessed at the requestor computer system.

13. The print fulfillment computer system of claim 11, wherein the sending of the address causes launching of a web browser at the requestor computer system and accessing of the web site via the web browser.

14. The print fulfillment computer system of claim 11, wherein the web site is a web site to process charges in connection with the request to a credit card account, debit card account, or other user charge account.

15. The print fulfillment computer system of claim 11, wherein the job information is included within the print request.

16. The print fulfillment computer system of claim 11, wherein the address includes a URL.

17. The print fulfillment computer system of claim 11, wherein the payment validation is received by the print fulfillment computer system responsive to user-entered information in a payment dialog presented by the payment validation computer system, the payment dialog presenting a price, for the request, based on the job information.

18. A method of a fulfillment computer, comprising:
in response to receipt, from a mobile computing device via a network and via a web application accessed at the mobile computing device, of a request to print content at a network connected printer:
creating a release code to authorize printing of the content when provided at the network connected printer,
sending to the mobile computing device via the network the release code, and a URL address to connect the requestor computer system to a web site hosted by a payment validation computer system;
receiving the release code from the payment validation computer system, the received release code previously provided to the payment validation computer system by the requestor computer system;
in response to the received release code, sending to the payment validation computer system the job information;
receiving a payment validation from the payment validation computer system; and
sending the content to the network attached printer, for printing upon provision of the release code at the network attached printer.

19. The method of claim 18, wherein the web site is a web site to process charges relating to the request to a user account.

20. The method of claim 18, wherein the web site is a web site to process credit card or debit card charges relating to the request.

* * * * *

UNITED STATES PATENT AND TRADEMARK OFFICE
CERTIFICATE OF CORRECTION

| | | |
|---|---|---|
| PATENT NO. | : 9,195,425 B2 | Page 1 of 1 |
| APPLICATION NO. | : 14/397601 | |
| DATED | : November 24, 2015 | |
| INVENTOR(S) | : Murilo Juchem | |

It is certified that error appears in the above-identified patent and that said Letters Patent is hereby corrected as shown below:

Claims

In column 10, line 46, in Claim 1, delete "instructions" and insert -- instructions, --, therefor.

In column 12, line 49 approx., in Claim 18, delete "attached" and insert -- connected --, therefor.

In column 12, line 51 approx., in Claim 18, delete "attached" and insert -- connected --, therefor.

Signed and Sealed this
Seventh Day of June, 2016

Michelle K. Lee
*Director of the United States Patent and Trademark Office*